US 12,406,528 B2

United States Patent
Yang et al.

(10) Patent No.: US 12,406,528 B2
(45) Date of Patent: Sep. 2, 2025

(54) FACE RECOGNITION SYSTEMS AND METHODS FOR MEDIA PLAYBACK DEVICES

(71) Applicant: Avago Technologies International Sales Pte. Limited, Singapore (SG)

(72) Inventors: Zhijie Yang, Irvine, CA (US); Xuemin Chen, Rancho Santa Fe, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 406 days.

(21) Appl. No.: 18/102,639

(22) Filed: Jan. 27, 2023

(65) Prior Publication Data

US 2024/0257555 A1 Aug. 1, 2024

(51) Int. Cl.
*G06V 40/16* (2022.01)
*G06V 10/74* (2022.01)

(52) U.S. Cl.
CPC .......... *G06V 40/172* (2022.01); *G06V 10/761* (2022.01)

(58) Field of Classification Search
CPC ...... G06V 10/761; G06V 10/82; G06V 20/41; G06V 40/165; G06V 40/172; G06V 40/50
See application file for complete search history.

(56) References Cited

U.S. PATENT DOCUMENTS 8,494,231 B2 * 7/2013 Folta .................... G06V 40/173
382/118

FOREIGN PATENT DOCUMENTS

CN 102360421 A * 2/2012

OTHER PUBLICATIONS

Kumar et al, "Face Recognition in videos by label propagation", 2015 (Year: 2015).*
Ortiz et al, "Face recognition in movie trailers via mean sequence sparse representation-based classification", 2013 (Year: 2013).*
European Search Report in European Patent Application No. 24153574. 9, Apr. 16, 2024.
G. Gao et al, "Cloud-Based Actor Identification With Batch-Orthogonal Local-Sensitive Hashing and Sparse Representation," in IEEE Transactions on Multimedia, vol. 18, No. 9, pp. 1749-1761, Sep. 2016.
V. Kumar, A. Namboodiri and C. Jawahar, "Face Recognition in Videos by Label Propagation," in 2014 22nd International Conference on Pattern Recognition (ICPR), Stockholm, Sweden, Aug. 24, 2014, pp. 303-308.

* cited by examiner

*Primary Examiner* — Ruiping Li

(57) ABSTRACT

A method includes accessing a video comprising a set of frames; receiving a command to identify a target displayed in a first frame; generating a first target data based on the target; generating a first confidence level between the first target data and a second target data stored in a remote database, wherein the second target data comprises identity data; in response to the first confidence level being at or above a confidence level threshold, outputting the identity data of the second target data; otherwise, generating a third target data based on the target displayed in a second frame of the set of frames; generating a second confidence level of similarity between the third target data and the second target data stored in the remote database; in response to the second confidence level being at or above the confidence level threshold, outputting the identity data of the second target data.

20 Claims, 7 Drawing Sheets

FACE RECOGNITION SYSTEMS AND METHODS FOR MEDIA PLAYBACK DEVICES

TECHNICAL FIELD

Exemplary implementations of this disclosure may generally relate to systems and methods for video processing and, more particularly, to face recognition for media devices.

BACKGROUND

Media devices (e.g., set-top boxes) may support the playback of video content. When watching a video, a user may want to identify a person shown in the video and obtain more information about the person. One approach utilizes a cloud-based facial recognition service by uploading the video of interest to the cloud. Such an approach is usually slow, expensive, and may not be accessible. Aspects of the subject technology include an edge-based face recognition process that provides a local processing flow.

BRIEF DESCRIPTION OF THE DISCLOSURE

Exemplary implementations include a method that includes accessing a video comprising a set of frames; receiving a command to identify a target displayed in a first frame of the set of frames; generating a first target data based on the target displayed in the first frame; generating a first confidence level of similarity between the first target data and a second target data stored in a remote database, wherein the second target data comprises identity data; in response to the first confidence level being at or above a confidence level threshold, outputting the identity data of the second target data; and in response to the first confidence level being below the confidence level threshold: generating a third target data based on the target displayed in a second frame of the set of frames; generating a second confidence level of similarity between the third target data and the second target data stored in the remote database; in response to the second confidence level being at or above the confidence level threshold, outputting the identity data of the second target data; and in response to the second confidence level being below the confidence level threshold, determining that the target is not identified.

Exemplary implementations also include a system including a processor. The processor may be configured to perform operations including accessing a video comprising a set of frames; receiving a command to identify a target displayed in a first frame of the set of frames; generating a first target data based on the target displayed in the first frame; generating a first confidence level of similarity between the first target data and a second target data stored in a remote database, wherein the second target data comprises identity data; in response to the first confidence level being at or above a confidence level threshold, outputting the identity data of the second target data; and in response to the first confidence level being below the confidence level threshold: generating a third target data based on the target displayed in a second frame of the set of frames; generating a second confidence level of similarity between the third target data and the second target data stored in the remote database; in response to the second confidence level being at or above the confidence level threshold, outputting the identity data of the second target data; and in response to the second confidence level being below the confidence level threshold, determining that the target is not identified.

Exemplary implementations further include a system including a processor. The processor may be configured to perform operations including accessing a video comprising a set of frames; receiving a command to identify a target displayed in a first frame of the set of frames; generating a first target data based on the target displayed in the first frame; generating a first confidence level of similarity between the first target data and a second target data stored in a remote database, wherein the second target data comprises identity data; in response to the first confidence level being at or above a confidence level threshold: displaying the identity data of the second target data; storing the second target data in a local database; in response to the first confidence level being below the confidence level threshold: generating a third target data based on the target displayed in a second frame of the set of frames; generating a second confidence level of similarity between the third target data and the second target data stored in the remote database; in response to the second confidence level being at or above the confidence level threshold, outputting the identity data of the second target data; and in response to the second confidence level being below the confidence level threshold, determining that the target is not identified.

BRIEF DESCRIPTION OF THE DRAWINGS

Certain features of the subject technology are set forth in the appended claims. However, for the purpose of explanation, several example implementations of the subject technology are set forth in the following figures.

The figures depict various implementations for purposes of illustration only. One skilled in the art will readily recognize from the following discussion that alternative implementations of the structures and methods illustrated herein may be employed without departing from the principles described herein.

Not all depicted components may be used in all implementations, however, and one or more implementations may include additional or different components than those shown in the figures. Variations in the arrangement and type of the components may be made without departing from the spirit or scope of the claims as set forth herein. Additional components, different components, or fewer components may be provided.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

When watching a video, a user may want to identify a person shown in the video and obtain more information about the person. For example, in a movie, a user may want to identify a new actor and learn about other movies featuring the actor; in a soccer game, the user may want to identify a player and view the player's statistics; in a news report, the user may want to identify a politician and view the politician's background. One approach for identifying a person shown in a video and obtaining information about the target person includes transmitting a frame (e.g., a video frame) showing the target person to a remote server for identification. However, such an approach may be slow, expensive, and inaccessible. Aspects of the subject technology include an edge-based face recognition process that provides a local processing flow to address this problem. Aspects may be based on face detection, tracking, and/or recognition technologies that may be realized in systems on a chip (SoC).

Figure 1:
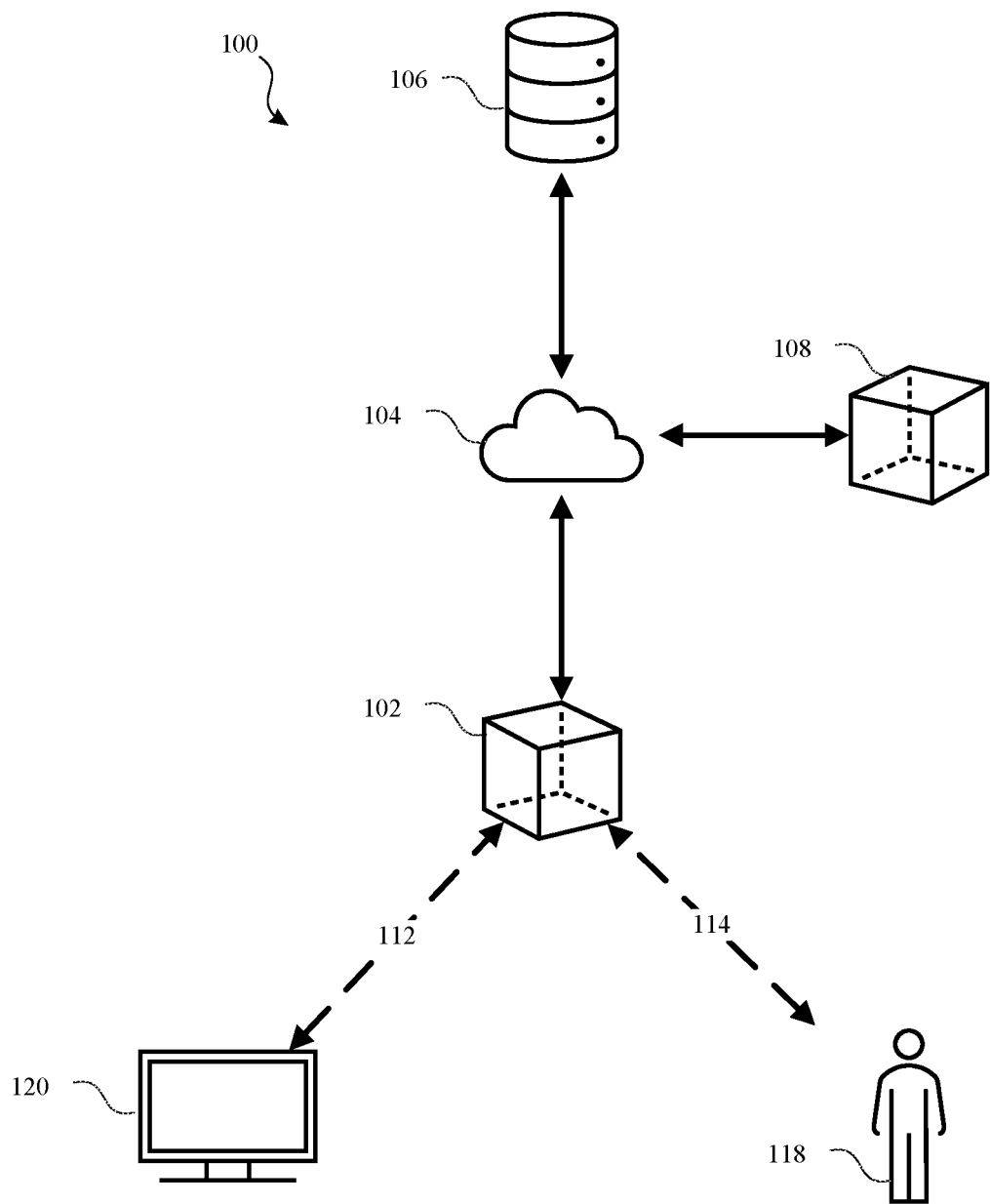
FIG. 1 illustrates an exemplary network configuration of a media device, in accordance with one or more exemplary implementations.

FIG. 1 illustrates an exemplary network configuration 100 of a media device, in accordance with one or more exemplary implementations. A media device 102 may include set-top boxes, digital media players, stream media adapters, or any other device capable of presenting video via a video signal 112 and/or receiving commands 114 from a user 118. The video may be a file, a stream, or any other format accessed locally and/or remotely (e.g., from a server 106). The command 114 may be a process performed by the media device 102, such as initiating a face recognition process, pausing a video, identifying a subject of the video, requesting more information regarding a subject of the video, and any other video-related command. The media device 102 may be connected to an electronic display 120 (e.g., a television), which may receive the video signal 112 that may be used to present a face to the user 118.

A starting frame (also referred to herein as a current frame) may be selected via a user interface (e.g., a remote control or a microphone) on the media device 102, which may generate an initiation signal causing the media device 102 to begin facial recognition. A face in the starting frame may be detected using face detection and/or recognition, and facial data for the face may be generated from the detected face. If the identity of the detected face cannot be determined based on the facial data from a single frame, a bidirectional refinement process may be performed where adjacent frames are used to generate additional facial data. The subject technology may automatically determine the number of frames for completing face detection and recognition and may also index the frames for display or abandon the detection effort if faces are not detectable in current and adjacent frames. Although one use case may be for live or on-demand videos for facial recognition, the subject technology may also be applied in other applications such as home surveillance and advertisement verification. For example, a system may identify unknown subjects in a user's house by comparing a face captured via a security camera to the faces of household members. As another example, by comparing faces in a decoded video with faces of an advertisement, advertisers may verify that their advertisements are decoded on the customer media devices.

The media device 102 may perform all or most of the video analysis locally (also referred to herein as the "edge" or "on device") to reduce the amount of work that may be performed remotely (also referred to herein as "externally" or "off device") such as by a cloud server. The media device 102 may include one or more machine learning models for face detection, tracking, and/or recognition, which may be performed locally. The one or more machine learning models may analyze one or more video frames to identify one or more subjects. The one or more machine learning models may also extract facial data of the identified subjects. The media device 102 may cross-reference the facial data with a database of subject identities represented by facial data. Facial data may include images, characteristics (e.g., location of ears, eyes, mouth, and the like), numerical representations (e.g., embeddings, vectors, and the like), and/or any other data relating to a face (hereinafter "facial data"). The database may be on the media device 102, the server 106, another media device 108, or any other network location via a network 104. Transmitting facial data may utilize less bandwidth than video data (e.g., frames), which may improve the efficiency of video analysis.

The facial data may be stored in local storage (e.g., system memory, flash drive, etc.). On subsequent presentation of the video to the user 118, the media device 102 may reference the local storage in order to save computing power. Facial data may also or instead be stored on a remote server (e.g., server 106). In instances where another media device 108 presents the video, the other media device 108 may reference remote storage to save computing power.

Figure 2:
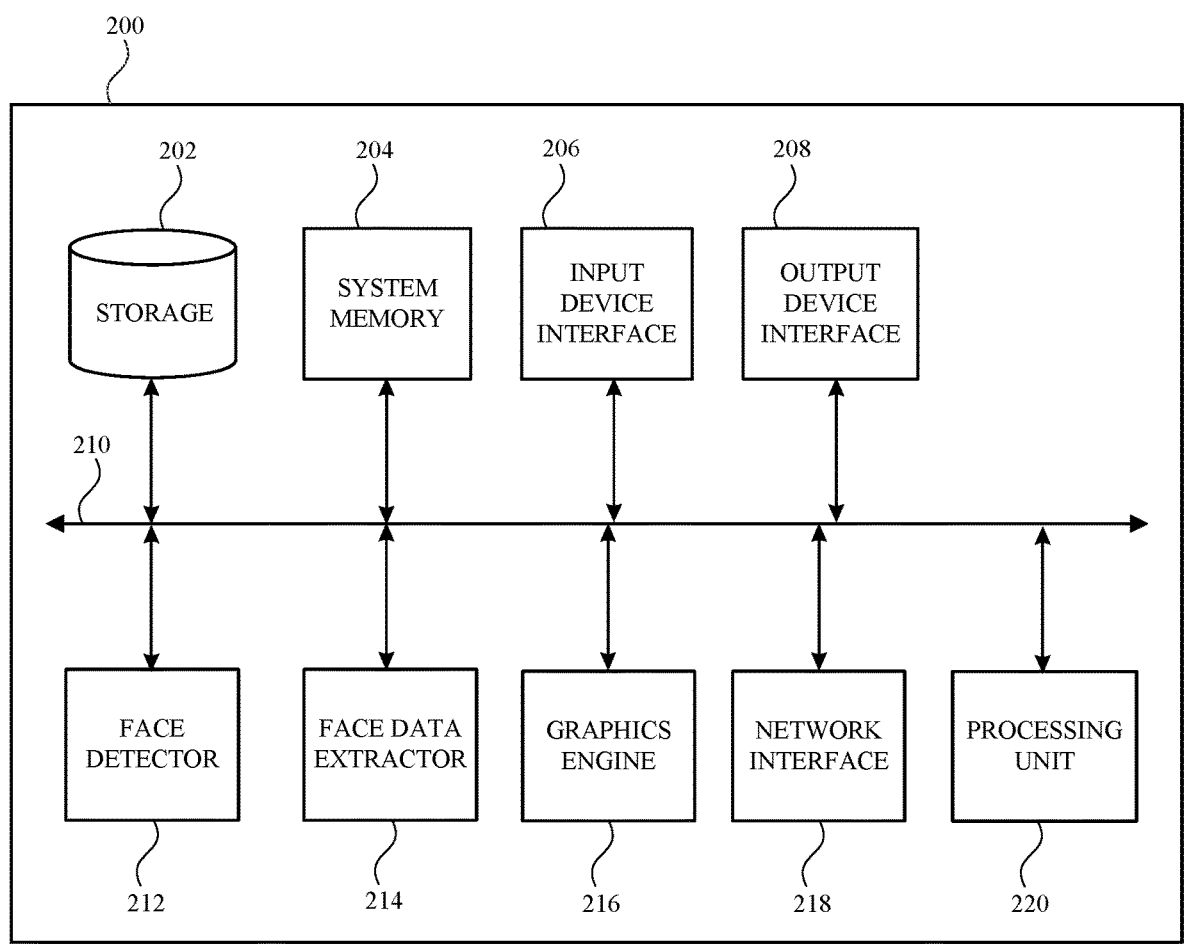
FIG. 2 illustrates an exemplary computing system of a media device, in accordance with one or more exemplary implementations.

FIG. 2 illustrates a computing system 200, in accordance with one or more exemplary implementations. The computing system 200 may be, and/or may be a part of, the media device 102, as shown in FIG. 1. The computing system 200 may include various types of computer-readable media and interfaces for various other types of computer-readable media. The computing system 200 includes a bus 210, a processing unit 220, a storage device 202, a system memory 204, an input device interface 206, an output device interface 208, a face detector 212, a facial data extractor 214, a graphics engine 216, and/or a network interface 218.

The bus 210 collectively represents all system, peripheral, and chipset buses that communicatively connect the various components of the computing system 200. In one or more implementations, the bus 210 communicatively connects the processing unit 220 with the other components of the computing system 200. From various memory units, the processing unit 220 retrieves instructions to execute and data to process in order to execute the operations of the subject disclosure. The processing unit 220 may be a controller and/or a single- or multi-core processor or processors in various implementations.

The bus 210 also connects to the input device interface 206 and output device interface 208. The input device interface 206 enables the system to receive inputs. For example, the input device interface 206 allows a user to communicate information and select commands on the system 200. The input device interface 206 may be used with input devices such as keyboards, mice, and other user input devices, as well as microphones, cameras, and other sensor devices. The output device interface 208 may enable, for example, a display of frames (e.g., images) generated by computing system 200. Output devices that may be used with the output device interface 208 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more implementations may include devices that function as both input and output devices, such as a touchscreen.

The bus 210 also couples the system 200 to one or more networks (e.g., network 104) and/or to one or more network nodes through the network interface 218. The network interface 218 may include one or more interfaces that allow the system 200 to be a part of a network of computers (such as a local area network (LAN), a wide area network (WAN), or a network of networks (the Internet)). Any or all components of the system 200 may be used in conjunction with the subject disclosure.

The graphics engine 216 may be hardware and/or software for manipulating frames (e.g., video frames). The graphics engine 216 may prepare frames for presentation via an output device interface 208. The graphics engine 216 may crop, scale, or otherwise manipulate a frame to conform to input requirements for one or more machine learning models utilized in the subject technology (e.g., the face detector 212 and the facial data extractor 214). The graphics engine 216 may also include a video decoder for receiving frames from a coded picture buffer and outputting decoded frames into a decoded picture buffer. The graphics engine 216 may also include a post-processing engine for receiving frames from a decoded picture buffer and output frames to a display picture for displaying the frame to an electronic display (e.g., the output device interface 208). The post-processing engine may also convert a frame from the decoded picture buffer to match an input size and/or a pixel format of the face detector 212.

The face detector 212 may be hardware and/or software for identifying one or more faces in a frame. In one or more implementations, the face detector 212 may be included in a neural processing unit. Face detection may be synchronous or asynchronous to the displaying of a frame (e.g., via an output device interface 208). The face detector 212 may receive a frame as input, which may include a frame of a video. The face detector 212 may output one or more bounding boxes that outline one or more faces presented in the frame. The output may be generated based on one or more machine learning models trained to identify one or more faces and generate corresponding bounding boxes. The machine learning model may be trained with a data set including a set of frames labeled with the faces contained in the frame. The machine learning model may also or instead may be trained to recognize one or more pixels that represent facial features.

The facial data extractor 214 may be hardware and/or software for extracting facial data. In one or more implementations, the face detector 212 may be included in a neural processing unit. The facial data extractor 214 may receive as input a frame (or subsets thereof) input to the face detector 212, such as a portion of the frame included in the bounding box. The facial data extractor 214 may output, for example, vectors, embeddings, images, or any other data relating to a face.

A challenge in facial recognition is that a face may not be facing a camera. Faces that are turned away may only allow for partial facial data to be extracted. The facial data extractor 214 may include an algorithm that refines facial data to obtain more facial data. Refining may include referring to adjacent frames to select a frame that displays the target face more fully (e.g., when the face is turned toward the camera). To select such a frame, the facial data extractor 214 may select a frame that includes the target face based on matches of partial facial data. The facial data extractor 214 may compare the partial facial data with facial data of a face in an adjacent frame and determine whether the face in the adjacent frame matches the partial facial data. For example, the target face and the face in the adjacent frame may have matching facial areas such as the bottom of the chin, the top of the nose, the outsides of the eyes, various points around the eyes and mouth, etc.

The storage device 202 may be a read-and-write memory device. The storage device 202 may be a non-volatile memory unit that stores instructions and data (e.g., static and dynamic instructions and data) even when the computing system 200 is off. The storage device 202 may include one or more databases, storage volumes, caches, and other data structures. In one or more implementations, a mass-storage device (such as a magnetic or optical disk and its corresponding disk drive) may be used as the storage device 202. In one or more implementations, a removable storage device (such as a floppy disk, flash drive, and its corresponding disk drive) may be used as the storage device 202.

Like the storage device 202, the system memory 204 may be a read-and-write memory device. However, unlike the storage device 202, the system memory 204 may be a volatile read-and-write memory, such as random-access memory. The system memory 204 may store any of the instructions and data that one or more processing unit 220 may need at runtime to perform operations. The system memory 204 may also include one or more buffers, caches, and other forms of data structures. In one or more implementations, the processes of the subject disclosure are stored in the system memory 204 and/or the storage device 202. From these various memory units, the one or more processing unit 220 retrieves instructions to execute and data to process in order to execute the processes of one or more implementations.

Implementations within the scope of the present disclosure may be partially or entirely realized using a tangible computer-readable storage medium (or multiple tangible computer-readable storage media of one or more types) encoding one or more instructions. The tangible computer-readable storage medium also may be non-transitory in nature.

The computer-readable storage medium may be any storage medium that may be read, written, or otherwise accessed by a general purpose or special purpose computing device, including any processing electronics and/or processing circuitry capable of executing instructions. For example, without limitation, the computer-readable medium may include any volatile semiconductor memory (e.g., the system memory 204), such as RAM, DRAM, SRAM, T-RAM, Z-RAM, and TTRAM. The computer-readable medium also may include any non-volatile semiconductor memory (e.g., the storage device 202), such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium may include any non-semiconductor memory, such as optical disk storage, magnetic disk storage, magnetic tape, other magnetic storage devices, or any other medium capable of storing one or more instructions. In one or more implementations, the tangible computer-readable storage medium may be directly coupled to a computing device, while in other implementations, the tangible computer-readable storage medium may be indirectly coupled to a computing device, e.g., via one or more wired connections, one or more wireless connections, or any combination thereof.

Instructions may be directly executable or may be used to develop executable instructions. For example, instructions may be realized as executable or non-executable machine code or as instructions in a high-level language that may be compiled to produce executable or non-executable machine code. Further, instructions also may be realized as or may include data. Computer-executable instructions also may be organized in any format, including routines, subroutines, programs, data structures, objects, modules, applications, applets, functions, etc. As recognized by those of skill in the art, details including, but not limited to, the number, structure, sequence, and organization of instructions may vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Figure 3:
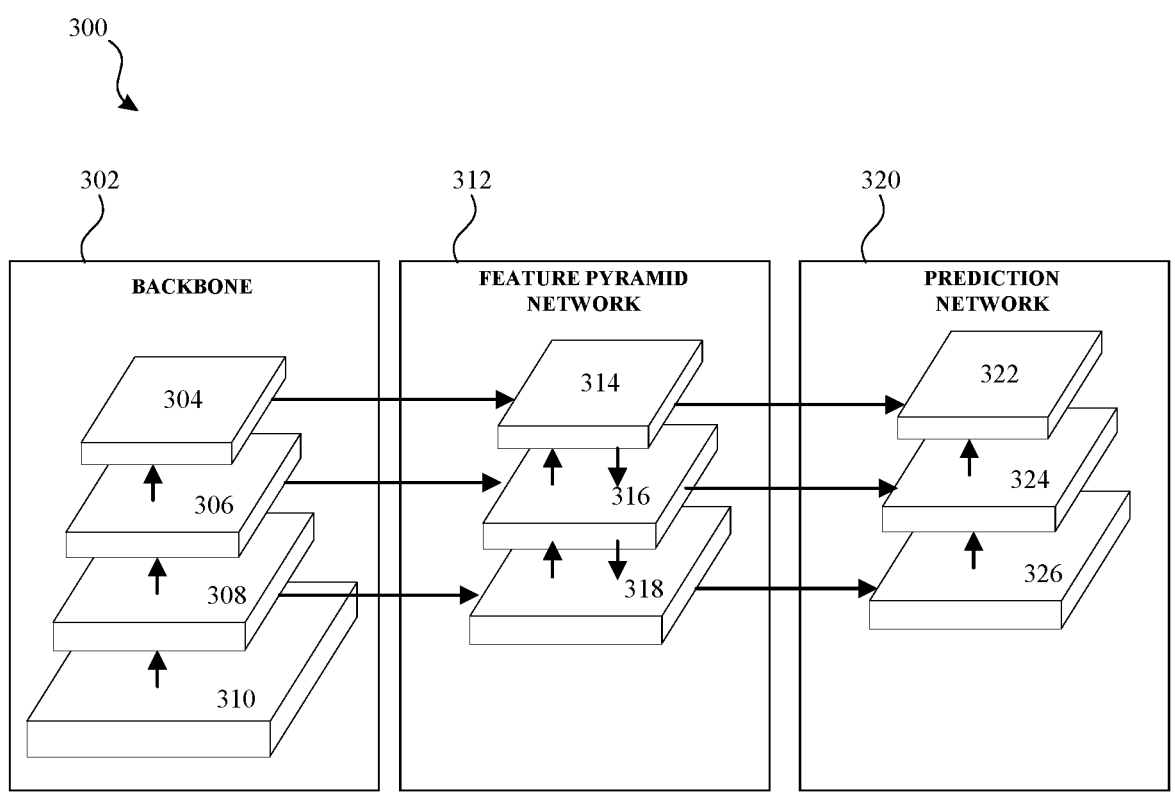
FIG. 3 illustrates a schematic diagram of a machine learning model for facial recognition, in accordance with one or more exemplary implementations.

FIG. 3 illustrates a schematic diagram of a machine learning model 300 for facial recognition, in accordance with one or more exemplary implementations. The face detector 212 and facial data extractor 214 may both be machine learning models. A machine learning model may include a sequence of neural network layers. For example, the machine learning model 300 includes a neural network architecture of an example face detector. The machine learning model 300 may include a backbone 302, feature pyramid network 312, and prediction network 320. Features may be extracted using the backbone network 302 that includes multiple layers (e.g., layers 304, 306, 308, 310), which may represent a set of convolutions. The extracted features at different scales may then be fused in the feature pyramid network 312, which includes multiple layers (e.g., layers 314, 316, 318). Finally, the prediction network 320, which may also have multiple layers (e.g., layers 322, 324, 326), may be used to predict the bounding box coordinate, class probabilities, etc., based on the fused features from the feature pyramid network 312.

Figure 4:
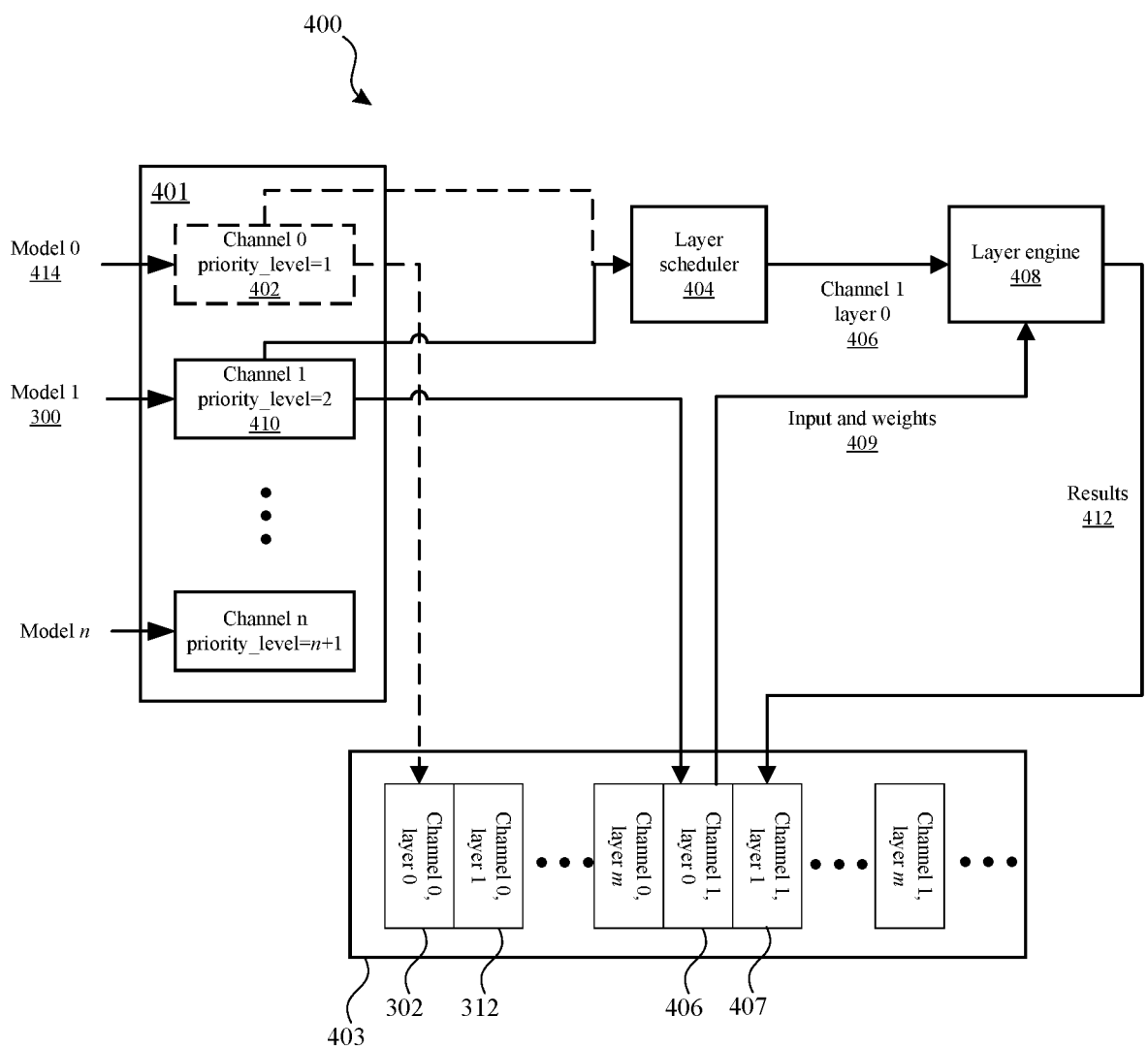
FIG. 4 illustrates a schematic diagram of a multi-channel manager, in accordance with one or more exemplary implementations.

FIG. 4 illustrates a schematic diagram of a multi-channel manager 400, in accordance with one or more exemplary implementations. The manager 400 may be configured to accelerate the inference of one or more machine learning models (e.g., machine learning model 300). For example, the manager 400 may orchestrate the execution of the processing of machine learning models such that layers of the machine learning models may be scheduled for utilizing processor time while other layers are suspended. The division of processor time between machine learning models allows multiple models to be processed simultaneously, dividing the work for each model into discrete units (e.g., per layer or channel). The division of processor time between machine learning models allows the manager 400 to prioritize certain machine learning tasks. For example, when the media device 102 listens for audio (including commands) from the user 118, the media device may utilize a machine learning model for voice analysis to extract the commands 114 from the audio captured by the microphones of the media device 102. To prevent delay in audio processing and enhance the user experience, the manager 400 may prioritize one or more layers of the machine learning model that processes the voice of the user 118 such that the commands 114 may be determined while other machine learning processes may be temporarily suspended.

The manager 400 may include a channel queue 401, a layer scheduler 404, and a layer engine 408. When the processing of a machine learning model begins, a work list 403 may be created in memory (e.g., system memory 204). The work list 403 may include a sequence of layer execution tasks where a layer may be a part of a channel belonging to a machine learning model. For example, the work list 403 may include layers 304, 306, 308, 310 of the backbone 302 channel of the machine learning model 300. The layers in the work list 403 may be arranged according to the priority of their corresponding machine learning model. The layers in the work list 403 may be grouped according to the corresponding machine learning model The layer scheduler 404 may add the work list 403 to a queue of a layer scheduler 404 based on a priority level (e.g., on a per machine learning model basis, a per channel basis, or a per layer basis) such that the higher priority layers may be processed first. The layer engine 408 may then process the layers according to the order provided by the layer scheduler 404. The layer engine 408 may also write the processing results 412 as input to the next layer or as output if the processed layer is an output layer. The channel queue 401 tracks layer processing and notifies the corresponding machine learning model (or subsets thereof) when the layers of the machine learning model have been completed.

For example, assume the machine learning model 414 is configured to process voice commands from the user. The machine learning model 414 may have a priority level 402, which may be pre-determined. A machine learning model 300 may be initiated for identifying one or more faces in a frame and may have a priority level 410. The priority level 402 may be higher priority than the priority level 410 so that the responsiveness and the user experience of the media device may be improved.

In this example, the machine learning model 300 may be placed in the channel queue 401 (e.g., in system memory 204) as it begins execution. The layers 406, 407 of the machine learning model 300 may be added to the work list 403 for storage, and indications (e.g., pointers) of the layers 406, 407 may be added to the layer schedule 404 to queue the layers 406, 407 for processing. The layer 406 may be first in the queue and passed as input to the layer engine 408, along with the inputs and weights 409 associated with the layer 406, for processing. The results of the processing of the layer 406 may be passed to the layer 407 to modify the layer 407 (e.g., adjust the associated inputs and/or weights). Other layers of other machine learning models may be queued between the layer 406, 407. Once the layers 406, 407 are finished processing, the machine learning model 300 may be notified and/or removed from the channel queue 401.

Continuing with the previous example, the machine learning model 414 may subsequently be added to the queue (as indicated by the dashed lines in FIG. 4). Because the machine learning model 414 has a higher priority than the machine learning model 300, the machine learning model 414 may be placed at the top of the channel queue 401, which may cause the layers 302, 312 of the machine learning model 414 to be placed at the front of the work list. The layer scheduler 404 may then interrupt the execution of the machine learning model 300 to execute the higher priority tasks from the machine learning model 414.

Figure 5:
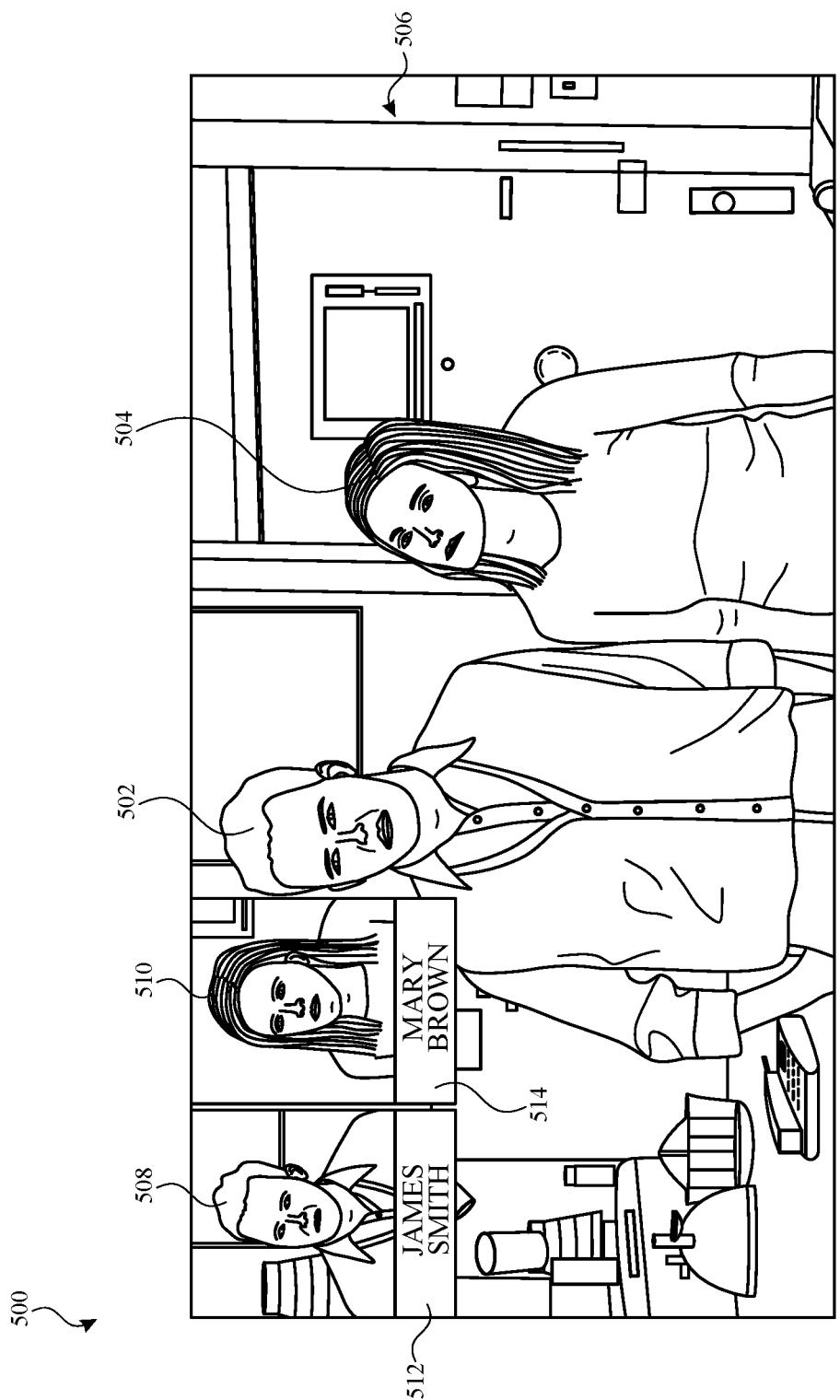
FIG. 5 illustrates an example frame of a video, in accordance with one or more exemplary implementations.

FIG. 5 illustrates a frame 500 of a video, in accordance with one or more exemplary implementations. To present a video, the video may pass through a display process. The display process may encode, decode, resize, or otherwise manipulate frames before they are displayed. A face recognition process may be synchronous to the display process. A user may send an initiation signal (e.g., command 114) to a media device (e.g., media device 102), such as a video (e.g., file or stream) player or set-top box, to start the face recognition process. The signal may be sent, for example, by pressing a button or using push-to-talk on a remote control associated with the media device or via far-field voice on the media device. The media device may pause the video at a frame 500 and perform a face recognition process on the frame 500. The face recognition process may identify faces 502, 504 displayed in the scene 506 of the frame 500. In one or more implementations, the face recognition process may identify at least portions of faces and utilize adjacent frames (e.g., $10^{th}$, $20^{th}$, and $30^{th}$) to identify displayed faces 502, 504 with a higher degree of confidence. One or more face patches for one or more displayed faces may be generated from a portion of one or more frames corresponding to one or more bounding boxes of the one or more displayed faces. The displayed faces may be presented to the user by overlaying the face patches 508, 510 of the displayed faces 502, 504 and their corresponding identity data 512, 514 on the frame 500 currently displayed. The user may select a particular face to get more identity data about an individual associated with the face.

In one or more implementations, a face recognition process may be asynchronous to the display process. When a user starts face recognition, the video may continue without pausing. The media device may run the edge-based face recognition process in the background. The displayed faces 502, 504 may be extracted and displayed on top of the frame 500.

The face recognition process, synchronous or asynchronous, may include two steps. First, a face recognition process may be used to identify faces displayed in a frame. If the detected faces in the frame can be identified with high confidence (e.g., above a confidence level threshold), the recognition process may be concluded and a list of displayed faces may be returned. Otherwise, a face recognition refinement process is used to further identify unknown faces by looking into temporally adjacent frames to gather more data about the unknown faces.

Figure 6:
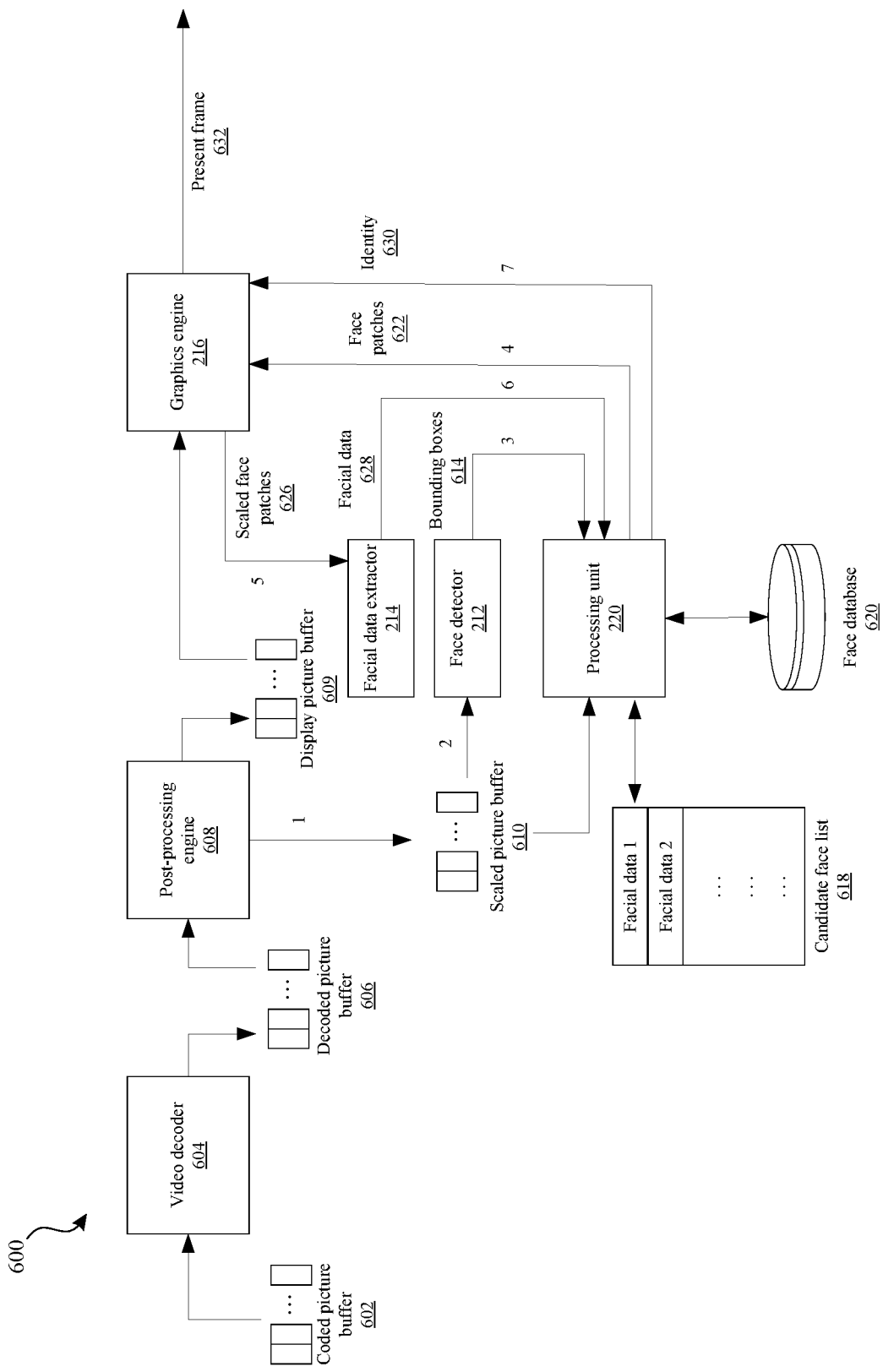
FIG. 6 illustrates a schematic diagram of a process for facial recognition in video, in accordance with one or more exemplary implementations.

FIG. 6 illustrates a schematic diagram of a process 600 for facial recognition in a video, in accordance with one or more exemplary implementations. A video may be input to the media device (e.g., media device 102) in a coded format. Frames of the video may populate a coded picture buffer 602. A video decoder 604 may decode frames from the coded picture buffer 602 to a decoded picture buffer 606. In one or more implementations, the decoded picture buffer 606 may allocate one or more extra frame buffers so that the recycling of the decoded frame buffer may be delayed and thus keep one or more prior frames (e.g., frames that have already been passed to the post-processing engine 608) in the decoded picture buffer 606. The delay allows for the processing unit 220 to access frames prior to the current frame in the decoded picture buffer 606 without having to re-decode the frames (e.g., to access adjacent frames that are prior to the current frame, as described with respect to FIG. 7 at block 714).

Decoded video frames in the decoded picture buffer 606 may be sent to a display buffer 609 and/or adjusted via a post-processing engine 608 according to an input size and/or pixel format of a face detector 212 (step 1). Adjusting decoded frames may include but is not limited to scaling, cropping, color space conversion, HDR-to-SDR tone mapping, etc. The results of the adjustments are written into a scaled picture buffer 610. The face detector 212 may then run face detection on a scaled frame from the scaled picture buffer 610 and output a list of detected faces with bounding boxes 614 (step 2). The processing unit 220 may extract a face patch 622, of a face selected by the user, from the scaled frame based on the bounding boxes 614 (step 3). The face patch 622 (e.g., a subset of the frame including a displayed face) may be further adjusted by the graphics engine 216 to match the input size of the facial data extractor 214 (step 4). The scaled face patch 626 may be sent to the facial data extractor 214 to get the facial data 628 of the displayed face selected by the user (step 5). The processing unit 220 may compare the extracted facial data 628 with facial data in the face database 620 and select a facial data in the face database 620 that matches the facial data 628 such that a confidence level of the match is above a confidence level threshold (step 6).

In instances where the extracted facial data 628 is matched with the selected facial data at a confidence level above a confidence level threshold (e.g., 75%), the extracted facial data associated with the selected facial data and any associated identity data may be sent to the graphics engine 216 for presentation 632 (step 7). The presentation 632 may include the current frame from the display buffer 609, face patch 622, and/or identity data 630. For example, the identity data 512, 514 may be overlaid along with their corresponding face patches 508, 510 on the current frame 500, as shown in FIG. 5.

In instances where the extracted facial data 628 is not matched with the selected facial data at a confidence level above the confidence level threshold, the extracted facial data 628 may not contain sufficient data (e.g., because the face may be angled) to generate a confident match with any facial data in the face database 620. Accordingly, a bi-directional face recognition refinement process may be performed to improve the extracted facial data 628 by looking into temporally adjacent frames (e.g., frames within a time period before or after the current frame). To improve the extracted facial data 628, the processing unit 220 may select a frame adjacent to the current frame. The adjacent frame may be in a direction behind or ahead of the current frame and include a face having facial data that corresponds to the extracted facial data 628 (e.g., the extracted facial data 628 is a subset of the facial data). The steps 1-6 described above may be repeated with the extracted facial data 628 and/or the facial data of the face from the adjacent frame. In instances where the facial data of the face from the adjacent frame still does not return a match from the face database 620, the processing unit 220 may repeat the process of selecting an adjacent frame until a frame is found that includes a face having facial data corresponding to the extracted facial data 628. Once the adjacent frame is selected, the steps 1-6 may be repeated with the adjacent frames until matching facial data is found in the face database 620 with a confidence level above the confidence level threshold.

In one or more implementations, a candidate face list 618 may be generated to create a queue of facial data for which to determine identities. The candidate face list 618 may be used for determining the identity data of multiple faces displayed in the current frame. For example, the user may want to determine the identity data of two faces in the current frame, in which case the facial data of the two faces may be added to a candidate face list 618 to be identified. If an identity data is found for a facial data in the candidate face list 618, the facial data may be removed from the candidate face list 618; otherwise, the facial data may be skipped (e.g., to generate an error that a face could not be identified). The media device may determine the identities for the remaining facial data in the candidate face list 618 (e.g., via steps 1-7) until the candidate face list 618 is empty or contains only skipped facial data.

Figure 7:
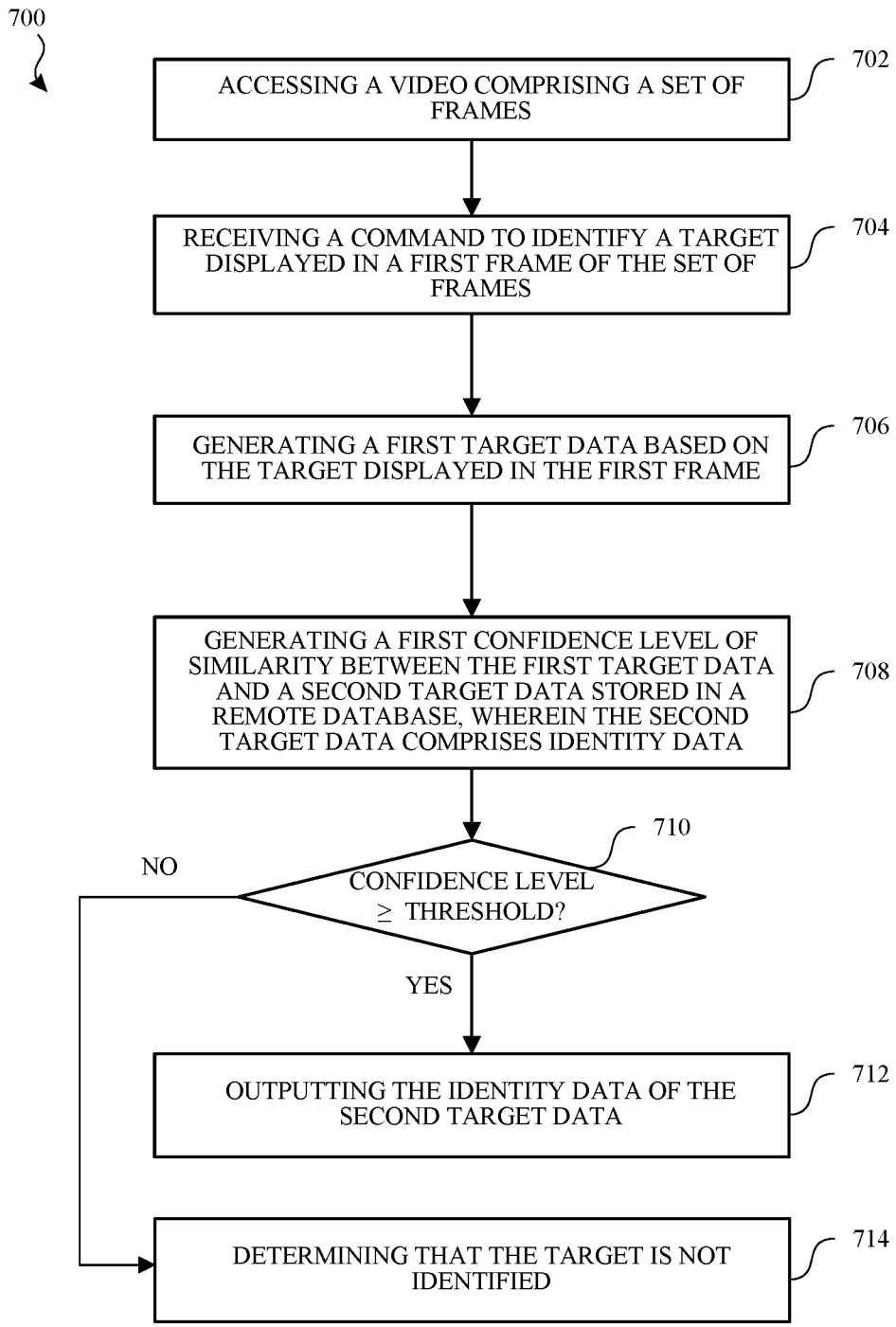
FIG. 7 illustrates a flow diagram of a process for facial recognition in video, in accordance with one or more exemplary implementations.

FIG. 7 illustrates a flow diagram of a process 700 for facial recognition in a video, in accordance with one or more exemplary implementations. For explanatory purposes, the process 700 is primarily described herein with reference to the FIGS. 1-6. One or more blocks (or operations) of the process 700 may be performed by one or more components of suitable devices, such as the system 200. Further, for explanatory purposes, the blocks of the process 700 are described herein as occurring in serial or linearly. However, multiple blocks of the process 700 may occur in parallel. In addition, the blocks of the process 700 need not be performed in the order shown and/or one or more blocks of the process 700 need not be performed and/or can be replaced by other operations.

In the process 700, at block 702, the media device (e.g., media device 102) may access a video. The video may be a file, stream, or any other format of video. The video may include a set of frames. One or more frames of the set of frames may include one or more targets (e.g., faces). The video may be accessed by downloading, streaming, receiving, fetching, querying, or any other method of acquiring a video.

At block 704, the media device may receive a command (e.g., from a user) to identify a target in a first frame (the "current frame") of the video. A target may be any subject in the frame such as a human, animal, object, and/or parts thereof. For example, a target may be a human face (e.g., as discussed with respect to FIG. 6). The command may be an instruction to identify one or more targets from the one or more targets that may be displayed in the frame. If the one or more frames display one or more targets, the one or more targets displayed in the one or more frames may be identified by a target detector (e.g., face detector 212).

At block 706, a first target data may be generated based on the target displayed in the first frame. Generating the target data may include the target detector (e.g., facial data extractor 214) of the media device performing target detection on the current frame and outputting one or more detected targets with their corresponding bounding boxes (e.g., bounding boxes 614) and target patches (e.g., face patches 622). A target patch may include an image of a target displayed in the frame as defined by a bounding box. In one or more implementations, the target patches may be adjusted (e.g., scaled) by the graphics engine (e.g., graphics engine 216) to match the input size of the target data extractor. The target patches (e.g., scaled face patches 626) may be sent to the target data extractor to convert the target patches (e.g., an image of a face) to target data corresponding to features of the target shown in the target patches. Converting the target patches to target data may include identifying metrics relating to target features such as distance between the eyes, distance from the forehead to the chin, distance between the nose and mouth, depth of the eye sockets, shape of the cheekbones, contour of the lips and ears, and any other metrics relating to the target shown in a target patch. The identified metrics may be converted to target data, which may include a set of numbers, data points, target embeddings, or other data representing a target.

In one or more implementations, the video may undergo preprocessing before target recognition. Preprocessing may include populating a coded picture buffer (e.g., coded picture buffer 602) with coded frames, decoding frames with a video decoder (e.g., video decoder 604), and preparing frames for display by populating a display buffer (e.g., display buffer 609). The preprocessed frame may be adjusted according to an input size and format of a machine learning model (e.g., face detector 212). Adjusting frames may include scaling, cropping, color space conversion, HDR-to-SDR tone mapping, etc.

At block 708, the media device may generate a first confidence level of similarity between the first target data and a second target data stored in a remote database. The database may be a repository of target data. The target data stored in the database may be associated with identity data of targets. For example, a target data may include representations of characteristics (e.g., eyes, nose, mouth) of an actor's face and the target data may be associated with the actor's identity data, which may include a profile of the actor including data such as name, age, and other shows featuring the actor.

Generating a confidence level of similarity between the target data of the target and the target data from the database may be performed by approaches that include, but are not limited to, machine learning models (e.g., computer vision models). A machine learning model may be trained based on training data that includes the target data stored in the database, as well as a known identity data associated with each target data. The trained machine learning model may receive as input target data and generate as output a number or set of values representing a confidence level (e.g., a percentage) that the input target data is recognized from the training data. The confidence level represents the accuracy of the comparison, which includes how close the input target data is to matching a target data in the training data, where the training data is based on the target data from the database. Determining how close the input target data is to matching the target data in the training data may be a function of variables including a quantity of matching data points between the sets of target data, a distance between data points in the sets of target data, and any other metric relating to the sets of target data.

At block 710, the determined confidence level may be compared to a threshold level of confidence. The determined confidence level may be a percentage and may be required to meet or exceed a pre-determined percentage (e.g., the threshold level) to be considered a successful match between the target data (e.g., the first target data) of the displayed target and the target data selected from the database. If the confidence level is at or above the threshold level, the process 700 may proceed to block 712.

At block 712, the media device may output identity data associated with the selected target data. The identity data may include data such as a name, occupation, age, or any other data relating to a target. The identity data may be included in the database and/or retrieved from a remote source. In one or more implementations, any data generated in the process 700 may also be output, such as target patches, bounding boxes, target data, and the like. Outputting the identity data may include sending the identity data to a graphics engine (e.g., graphics engine 216) to overlay identity data on the current frame to display the identity data to the user. For example, when the user pauses a video and issues a command to identify a target displayed in the paused frame, the media device may perform the process 700, resulting in the user seeing the frame with the identity data (e.g., the name) of the target next to the target on the frame.

In one or more implementations, identity data and target data of the displayed target may be stored in a remote or local storage. Storing the identity data may be for caching the data to improve the efficiency of subsequent target recognitions by the media device or another media device. This way, the same or different media device may query a remote or local storage with a video data and target data for a corresponding identity data. For example, if a first user directs the first media device to identify a character of a show at a particular time, the character's identity data, the show, and the time may be cached at a remote storage. When a second user directs the second media device to identify the same character of the same show at a similar time, the second media device may query the remote storage for target data of the character of the show at the time of the show to obtain the character's identity data.

In one or more implementations, the media device may generate a candidate target list (e.g., the candidate face list 618) for identifying multiple targets in the current frame. One or more sets of target data corresponding to one or more targets to be identified in the current frame may be added to the candidate target list. Target data in the candidate target list may be removed if an identity data corresponding to the target data is found or cannot be found after analyzing one or more (e.g., up to a threshold number) adjacent frames. The process 700 may be performed again for one or more sets of target data in the candidate target list until the candidate target list is empty or the candidate target list includes one or more sets of target data after repeating the performance of the process 700. In one or more implementations, the media device may output an error (e.g., a message stating that the target is "unknown") indicating that a set of target data cannot be identified if the set of target data remains in the candidate target list.

Returning to block 710, if the determined confidence level is below the confidence level threshold, process may proceed to block 714 where the target data may be refined by repeating the process 700 with a frame that is different than the current frame in an attempt to generate a higher confidence level.

In one or more implementations of block 714, the different frame may be one or more adjacent frames used to refine the target data of the displayed target. Adjacent frames include frames that are prior or subsequent to the current frame, and may be included in a decoded picture buffer (e.g., decoded picture buffer 606). Accessing one or more adjacent frames may reveal additional target data for the displayed target that may improve the confidence level between the target data of the displayed target and the target data in the database. For example, a target in the current frame may not be fully in the frame, and thus only part of the target can be identified in the frame. With only part of the target being in the current frame, only part of the target data may be extracted, which may reduce the confidence level of accuracy for the comparison. An adjacent frame may include the target in a different position, such that more of the target is captured in the frame, thereby revealing more of the target and allowing for more target data to be extracted.

To select an adjacent frame, the media device may identify one or more targets in an adjacent frame in a manner similar to block 702. The media device may identify a corresponding target in the adjacent frame that may correspond to the displayed target of the current frame. The target may be a corresponding target if its target data includes target data in addition to the target data of the displayed target in the current frame. That is, the target data of the target in the adjacent frame may refine the target data of the displayed target by adding the target data of the corresponding target to the target data of the displayed target, when the media device determines there is at least a partial match between the target data of the displayed target and the target data of the corresponding target. If the targets in the adjacent frame do not correspond to the displayed target, a new adjacent frame may be selected until a target corresponding to the displayed target is identified. The block 704 may be performed with the refined target data (e.g., target data from the corresponding target) from the adjacent frames. For example, the selected target data from the target database may be compared with the refined target data, a confidence level of accuracy between the selected target data and the refined target data may be determined, and an identity data corresponding to the selected target data may be output if the confidence level is at or above a confidence level threshold. If the refined target data still is not sufficient to generate a confidence level above the confidence level threshold, the media device may continue to refine the target data of the displayed target (e.g., up to a threshold number of frames) or determine that the target has not been identified (e.g., when a threshold number of frames have been analyzed).

In one or more implementations, the media device may analyze the scene (e.g., scene 506) to determine a direction (e.g., behind or ahead) to select the adjacent frame. If a scene has changed between the current frame and the adjacent frame, a target from the current frame is unlikely to be in the second frame. To determine whether a scene has changed, the media device may first select an adjacent frame in an initial direction (e.g., behind or ahead) from the current frame. The media device may identify one or more features of the scene from the current frame and the scene from the adjacent frame to determine whether the scene has changed from the current frame to the adjacent frame. For example, the features of a scene may include colors, brightness, characters, and other visual characteristics. If the scene has changed, the media device may terminate the search process in the initial direction (e.g., ahead) and search in the other direction (e.g., behind). If there is no scene change in the adjacent frame, the media device may proceed to select an adjacent frame for refining the target data from the current frame.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine (e.g., her) and vice versa. Headings and subheadings, if any, are used for convenience only and do not limit the subject disclosure.

What is claimed is:

1. A method, comprising:
    accessing a video comprising a set of frames;
    receiving a command to identify a target displayed in a first frame of the set of frames;
    generating a first target data based on the target displayed in the first frame;
    generating a first confidence level of similarity between the first target data and a second target data stored in a remote database, wherein the second target data comprises identity data;
    in response to the first confidence level being at or above a confidence level threshold, outputting the identity data of the second target data; and
    in response to the first confidence level being below the confidence level threshold:
        generating a third target data based on the target displayed in a second frame of the set of frames;
        generating a second confidence level of similarity between the third target data and the second target data stored in the remote database;
        in response to the second confidence level being at or above the confidence level threshold, outputting the identity data of the second target data; and
        in response to the second confidence level being below the confidence level threshold, determining that the target is not identified.

2. The method of claim 1, wherein the outputting step comprises:
    displaying the identity data of the second target data; and
    storing the second target data in a local database.

3. The method of claim 2, further comprising, in response to receiving a subsequent command to identify the target in a third frame of the set of frames:
    generating a fourth target data based on the target displayed in the third frame;
    generating a third confidence level of similarity between the fourth target data and the second target data stored in the local database; and
    in response to the third confidence level being at or above the confidence level threshold, outputting the identity data of the second target data.

4. The method of claim 1, further comprising:
    generating a candidate target list comprising the target data and a second target displayed in the first frame;

in response to the first confidence level being at or above the confidence level threshold, removing the target data from the candidate target list; and in response to the first confidence level being below the confidence level threshold, skipping the target data in the candidate target list; and in response to the candidate target list comprising a remaining target data, repeating the accessing, receiving, generating, generating, and outputting steps for the remaining target data of the candidate target list.

5. The method of claim 1, wherein the second frame is a first adjacent frame in a first direction from the first frame.

6. The method of claim 5, wherein the second frame is a second adjacent frame in the first direction from the first adjacent frame, in response to a third confidence level of similarity between the first target data and the third target data being below a second confidence level threshold.

7. The method of claim 5, wherein the second frame is a third adjacent frame in a second direction from the first frame, in response to determining that a scene of the first adjacent frame does not match a scene of the frame.

8. A system, comprising:
a processor configured to perform operations comprising:
accessing a video comprising a set of frames;
receiving a command to identify a target displayed in a first frame of the set of frames;
generating a first target data based on the target displayed in the first frame;
generating a first confidence level of similarity between the first target data and a second target data stored in a remote database, wherein the second target data comprises identity data;
in response to the first confidence level being at or above a confidence level threshold, outputting the identity data of the second target data; and
in response to the first confidence level being below the confidence level threshold:
generating a third target data based on the target displayed in a second frame of the set of frames;
generating a second confidence level of similarity between the third target data and the second target data stored in the remote database;
in response to the second confidence level being at or above the confidence level threshold, outputting the identity data of the second target data; and
in response to the second confidence level being below the confidence level threshold, determining that the target is not identified.

9. The system of claim 8, wherein the outputting operation comprises:
displaying the identity data of the second target data; and
storing the second target data in a local database.

10. The system of claim 9, wherein the operations further comprise, in response to receiving a subsequent command to identify the target in a third frame of the set of frames:
generating a fourth target data based on the target displayed in the third frame;
generating a third confidence level of similarity between the fourth target data and the second target data stored in the local database; and
in response to the third confidence level being at or above the confidence level threshold, outputting the identity data of the second target data.

11. The system of claim 8, wherein the operations further comprise:
generating a candidate target list comprising the target data and a second target displayed in the first frame;

in response to the first confidence level being at or above the confidence level threshold, removing the target data from the candidate target list; and in response to the first confidence level being below the confidence level threshold, skipping the target data in the candidate target list; and in response to the candidate target list comprising a remaining target data, repeating the accessing, receiving, generating, generating, and outputting steps for the remaining target data of the candidate target list.

12. The system of claim 8, wherein the second frame is a first adjacent frame in a first direction from the first frame.

13. The system of claim 12, wherein the second frame is a second adjacent frame in the first direction from the first adjacent frame, in response to a third confidence level of similarity between the first target data and the third target data being below a second confidence level threshold.

14. The system of claim 12, wherein the second frame is a third adjacent frame in a second direction from the first frame, in response to determining that a scene of the first adjacent frame does not match a scene of the frame.

15. A system, comprising:
a processor configured to perform operations comprising:
accessing a video comprising a set of frames;
receiving a command to identify a target displayed in a first frame of the set of frames;
generating a first target data based on the target displayed in the first frame;
generating a first confidence level of similarity between the first target data and a second target data stored in a remote database, wherein the second target data comprises identity data;
in response to the first confidence level being at or above a confidence level threshold:
displaying the identity data of the second target data;
storing the second target data in a local database;
in response to the first confidence level being below the confidence level threshold:
generating a third target data based on the target displayed in a second frame of the set of frames;
generating a second confidence level of similarity between the third target data and the second target data stored in the remote database;
in response to the second confidence level being at or above the confidence level threshold, outputting the identity data of the second target data; and
in response to the second confidence level being below the confidence level threshold, determining that the target is not identified.

16. The system of claim 15, wherein the operations further comprise, in response to receiving a subsequent command to identify the target in a third frame of the set of frames:
generating a fourth target data based on the target displayed in the third frame;
generating a third confidence level of similarity between the fourth target data and the second target data stored in the local database; and
in response to the third confidence level being at or above the confidence level threshold, outputting the identity data of the second target data.

17. The system of claim 15, wherein the operations further comprise:
generating a candidate target list comprising the target data and a second target displayed in the first frame;
in response to the first confidence level being at or above the confidence level threshold, removing the target data from the candidate target list; and in response to the first confidence level being below the confidence level threshold, skipping the target data in the candidate target list; and in response to the candidate target list comprising a remaining target data, repeating the accessing, receiving, generating, generating, and outputting steps for the remaining target data of the candidate target list.

18. The system of claim 15, wherein the second frame is a first adjacent frame in a first direction from the first frame.

19. The system of claim 18, wherein the second frame is a second adjacent frame in the set of frames that is subsequent or prior to the first adjacent frame, in response to a third confidence level of similarity between the first target data and the third target data being below a second confidence level threshold.

20. The system of claim 18, wherein the second frame is a third adjacent frame in the set of frames that is prior or subsequent to the first frame, in response to determining that a scene of the first adjacent frame does not match a scene of the frame.

\* \* \* \* \*